United States Patent [19]

Azusawa et al.

[11] Patent Number: 4,810,064
[45] Date of Patent: Mar. 7, 1989

[54] LIQUID CRYSTAL PROJECTION DISPLAY HAVING LASER INTENSITY VARIED ACCORDING TO BEAM CHANGE-OF-AXIS SPEED

[75] Inventors: Noboru Azusawa; Tadahiko Hashimoto; Hisayoshi Shiraishi, all of Katsuta; Yoshiharu Nagae, Hitachi, all of Japan

[73] Assignee: Hitachi, Ltd., Tokyo, Japan

[21] Appl. No.: 223,709

[22] Filed: Jul. 22, 1988

Related U.S. Application Data

[63] Continuation of Ser. No. 861,007, May 8, 1986, abandoned.

[30] Foreign Application Priority Data

May 10, 1985 [JP] Japan ................................. 60-97800

[51] Int. Cl.⁴ ............................................. G02F 1/13
[52] U.S. Cl. .................................... 350/351; 350/6.5; 350/6.91; 250/331; 340/713; 340/714; 372/21; 372/26; 372/31; 372/33
[58] Field of Search ...................... 350/6.5, 6.91, 351; 250/272.3, 331; 340/713, 714; 372/21, 26, 31, 33

[56] References Cited

U.S. PATENT DOCUMENTS

| | | | |
|---|---|---|---|
| 2,515,054 | 7/1950 | Pagliarulo | 350/358 |
| 3,717,772 | 2/1973 | Engman | 350/6.91 X |
| 3,719,780 | 3/1973 | Gazzad et al. | 350/6.91 X |
| 4,180,307 | 12/1979 | Tateoka | 350/6.5 |
| 4,211,474 | 7/1980 | LeGoff | 372/26 |
| 4,460,249 | 7/1984 | Vincent | 372/26 |
| 4,482,902 | 11/1984 | Bailey et al. | 350/6.5 |
| 4,639,722 | 1/1987 | Urabe et al. | 350/351 |

FOREIGN PATENT DOCUMENTS 2913270 10/1980 Fed. Rep. of Germany ........ 372/26

OTHER PUBLICATIONS

Dewey et al., "Laser Addressed Liquid Crystal Projection Displays" Proc. of SID, vol. 19/1, First Quarter 1978.

*Primary Examiner*—Stanley D. Miller
*Assistant Examiner*—Richard F. Gallivan
*Attorney, Agent, or Firm*—Antonelli, Terry & Wands

[57] ABSTRACT

The liquid crystal is written with a laser beam. The laser beam generated by a laser source is applied through an optical control unit such as galvanometer mirrors to the liquid crystal. The intensity of the laser beam applied to the liquid crystal is controlled by a laser beam intensity varying unit. A writing control unit controls the mechanical displacement caused by the optical axis control unit and controls the laser beam intensity varying unit. The laser beam energy applied to the liquid crystal can be maintained constant, thus enabling a constant written line width even during acceleration and deceleration of the optical axis control unit.

10 Claims, 11 Drawing Sheets

FIG. 5
(a)
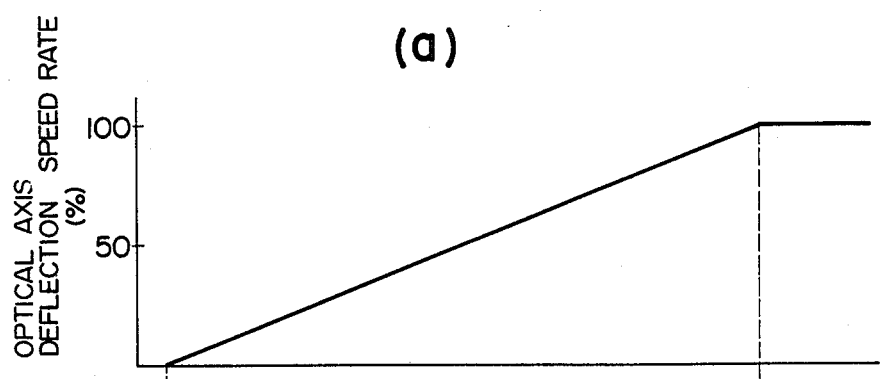
(b)
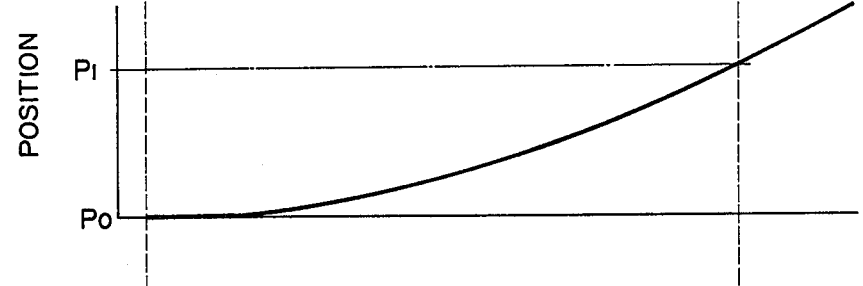
(c)
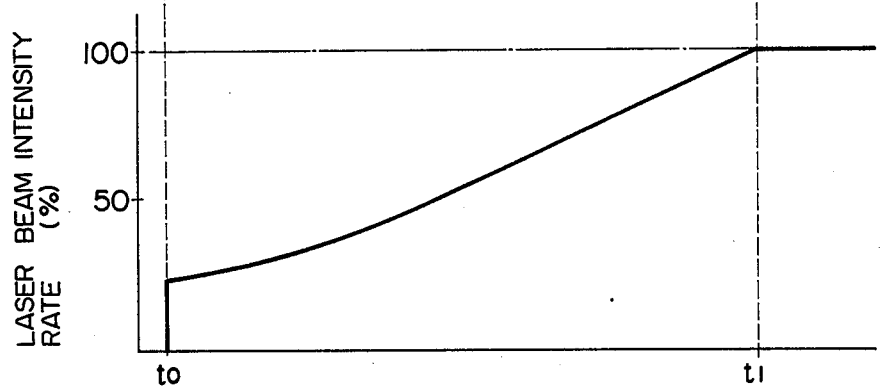

ered to the liquid crystal 10 and the other half
LIQUID CRYSTAL PROJECTION DISPLAY HAVING LASER INTENSITY VARIED ACCORDING TO BEAM CHANGE-OF-AXIS SPEED This application is a continuation of application Ser. No. 861,007, filed May 8, 1986 and now abandoned.

BACKGROUND OF THE INVENTION

1. Field of the Invention

The present invention relates to a liquid crystal projection display wherein a liquid crystal is thermally written with a laser beam.

2. Description of the Related Art

A demand for a large screen display has recently become great in control applications, particularly for such a display capable of displaying graphic patterns with high resolution. The liquid crystal projection display which uses a laser beam for thermal writing to the liquid crystal is a promising candidate meeting such requirements.

In the liquid crystal projection display, writing to the liquid crystal is achieved by deflecting a laser beam generated by a laser source with optical axis control means such as galvanometer mirrors and irradiating it onto the liquid crystal. Deflection of the laser beam is performed in the two directions of X axis and Y axis. As optical axis control means, a galvanometer type deflector or a rotary polygon mirror type deflector is employed which effects laser beam deflection by means of its mechanical displacement. In this case, however, the speed of displacement varies at the start and end of the mechanical displacement, and hence at the start and end of the deflection of the optical axis. As a result, there arises a problem that the width of a written line changes.

To solve this problem, it is known in the art that a laser beam for thermal writing is raster-scanned wider than the width of the liquid crystal to ensure a constant speed over the surface of the liquid crystal itself and a constant width of written lines. This technology is described in "Proceeding of the S.I.D.", Vol. 19/1, 1978, at pp. 1 to 7.

With this technology, it is necessary for the optical axis controller to be mechanically displaced even to the outside of the writing surface of the liquid crystal, resulting in a disadvantage that the writing time becomes long.

SUMMARY OF THE INVENTION

In view of the above problem, it is an object of the present invention to provide a liquid crystal projection display capable of thermal-writing a constant width line in short time using a laser beam.

The characteristic feature of the present invention resides in that the intensity of a laser beam irradiated on the liquid crystal is changed with the deflection speed of the optical axis. In other words, the present invention is characterized in that energy of the laser beam applied to the liquid crystal is always maintained constant irrespective of the deflection speed of the optical axis.

The above and other objects and features will become apparent from the following description.

BRIEF DESCRIPTION OF THE DRAWINGS

FIGS. 4 and 5 are graphs for explaining the performance of the present invention;

DESCRIPTION OF THE PREFERRED EMBODIMENT

Figure 1:
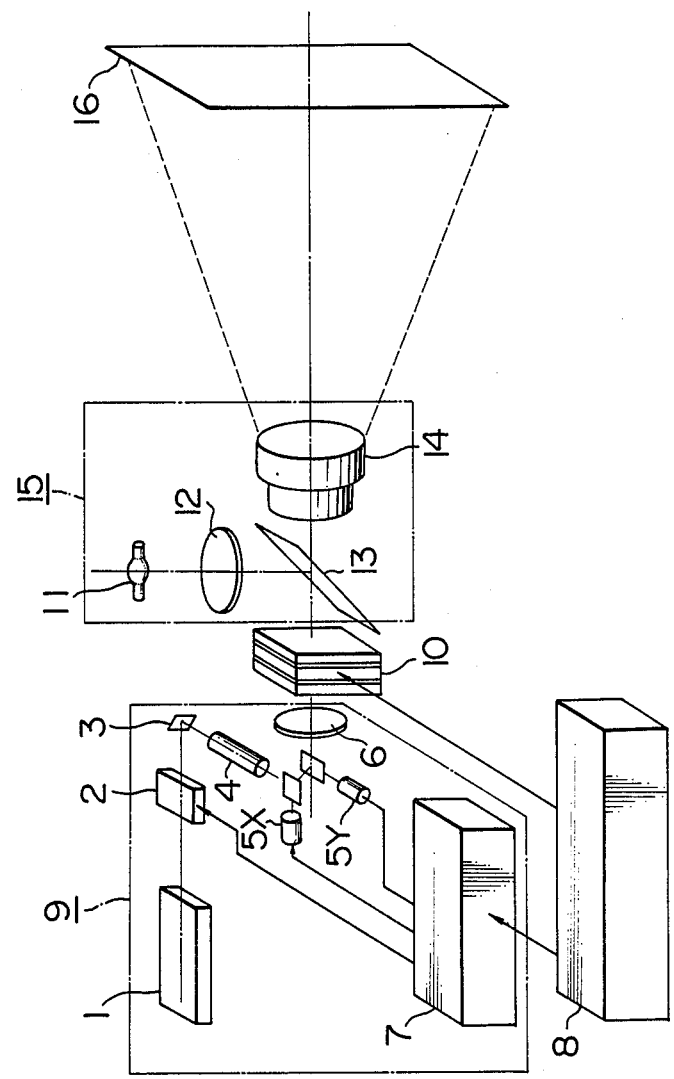
FIG. 1 is a schematic view showing the construction of the liquid crystal projection display according to an embodiment of the present invention.

The embodiment of the present invention is shown in FIG. 1. In the figure, a laser beam generated by a laser source 1 passes a modulator 2 and is reflected by a mirror 3 to change its optical path. The modulator 2 changes the laser beam intensity as will be described later. The beam diameter of the laser beam reflected by the mirror 3 is adjusted to a predetermined size at an expander 4 and applied to galvanometer mirrors 5X and 5Y. The galvanometer mirror 5X deflects the laser beam in the X direction, while the galvanometer mirror 5Y deflects the laser beam in the Y direction. The galvanometer mirrors 5X and 5Y continuously change their physical positions respectively based on an X axis position control signal and a Y axis position control signal supplied from a writing control circuit 7 to change the direction of the optical axis of the laser beam. The writing control circuit 7 may usually be a microprocessor. The laser beam with its optical axis deflected by the galvanometer mirrors 5X and 5Y is collected by a scan lens 6 and applied to a smectic liquid crystal 10. A screen controller 8 is inputted with position information from an unrepresented host computer to obtain an X axis position instruction signal and a Y axis position instruction signal which, in turn, are inputted to a writing control circuit 7. The controller 8 is supplied from the host computer, besides the position information, with display information either to write or erase, pattern information of a pattern to be written or erased, and so on. The screen controller 8 also controls the amplitude of an AC voltage applied to the liquid crystal 10 and its timing. Application of an AC voltage to the liquid crystal 10 is for performing either a full erase or a selective erase. The laser source 1, modulator 2, mirror 3, expander 4, galvanometer mirrors 5X and 5Y, scan lens 6, and writing control circuit 7 constitute a writing control system 9. Light from a light source 11 such as a xenon lamp is made parallel by a lens 12 and irradiated to a half-mirror 13. Half of the light quantity of the parallel light applied to the half-mirror 13 is transmitted therethrough, while the other half is applied to the liquid crystal 10. The light applied to the liquid crystal 10 is reflected from the area other than written lines. The reflected light is projected on a screen 16 via the half-mirror 13 and a projector lens 14. The light source 11, lens 12, half-mirror 13 and projection lens 14 constitute a projection system 15.

Figure 2:
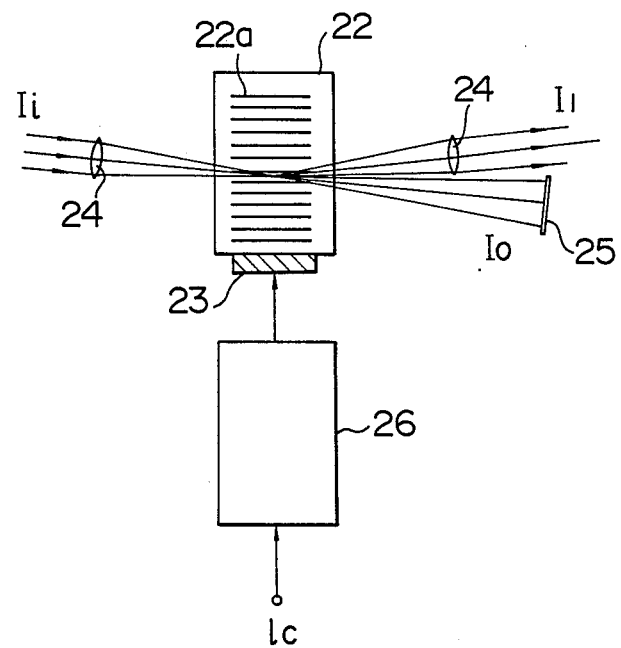
FIG. 2 schematically shows the structure of the acousto-optic modulator.

FIG. 2 shows an example of the modulator 2. Modulators are divided into those utilizing the electro-optical effect and those utilizing the acousto-optic effect. The modulator shown in FIG. 2 utilizes the acousto-optic effect.

Referring to FIG. 2, an incident laser beam Ii generated by the laser source 1 is collected by a condenser 24 to be applied to a glass member 22 to which a piezoelectric element 23 is fixed. The piezoelectric element 23 is driven by a piezoelectric element driver circuit 26. Upon vibration of the piezoelectric element 23, ultrasonic waves are propagated into the glass member 22. The incident laser beam $I_i$ is then split by a diffraction grating 22a into a first order beam $I_1$ and a 0 order beam $I_0$. The first order beam $I_1$ is made parallel by a lens 24 and applied to the mirror 3, while the 0 order beam $I_0$ is intercepted by a shutter 25.

Figure 3:
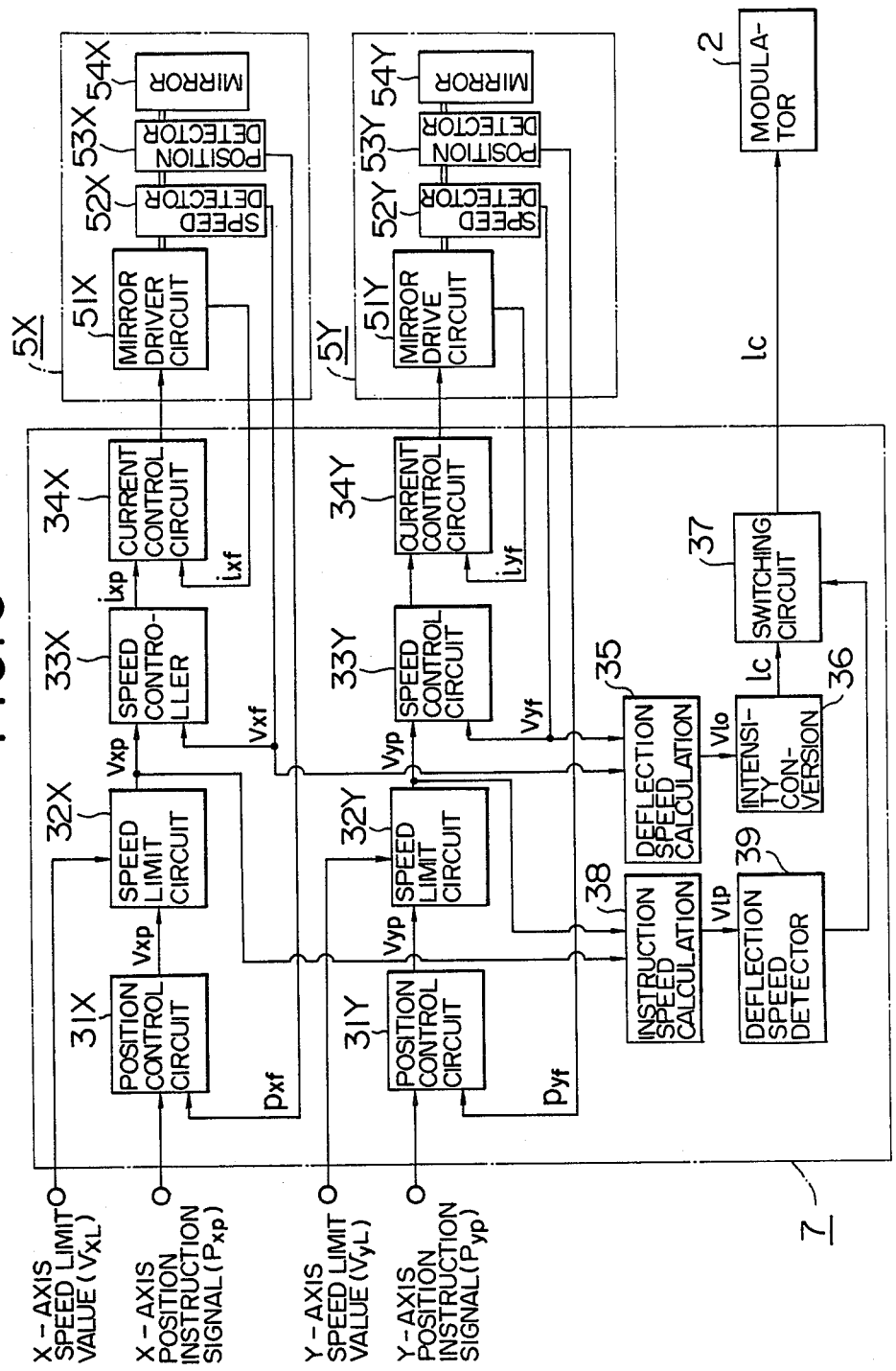
FIG. 3 is a detailed block diagram showing the write control circuit and the galvanometer mirrors.

A detailed block diagram of the writing control circuit 7 and the galvanometer mirrors 5X and 5Y is shown in FIG. 3. In the figure, the elements associated with the X axis are represented by suffix x, while the elements associated with the Y axis are represented by suffix y.

Referring to FIG. 3, a position control circuit 31X is inputted with an X axis position instruction signal Pxp supplied from the controller 8 and an X axis position signal Pxf detected with a position detector 53X detecting the position of the X axis mirror, and outputs a speed instruction signal $v_{xp}$ corresponding to a position deviation. The speed instruction signal $v_{xp}$ is applied to a speed control circuit 33X via a speed limit circuit 32X. An X axis speed limit value $v_{xL}$ is set at the speed limit circuit 32X by the controller 8. The X axis speed limit value $v_{xL}$ is determined by the positions of the writing start and end positions on an X-Y coordinate plane. The detailed description of the X axis speed limit value $v_{xL}$ will be given later. The speed controller 33X is inputted with the speed instruction signal $v_{xp}$ and a speed detecting signal $v_{xf}$ detected by the speed detector 52X, and outputs a current instruction signal $i_{xp}$ corresponding to a speed deviation to apply it to a current control circuit 34X. The current control circuit 34X actuates a mirror driver circuit 51X based on the current instruction signal $i_{xp}$ and drives a mirror 54X. A current $i_{xf}$ flowing through the mirror driver circuit 51X is fed back to the current control circuit 34X. The deflection speed and position of the mirror 54X are detected by the speed detector 52X and a position detector 53X both mechanically coupled to the mirror 54X. Similarly, the galvanometer mirror 5Y for the Y axis is driven based on a Y axis position instruction signal $P_{yp}$ by means of a position control circuit 31Y, speed limit circuit 32Y, speed control circuit 33Y and current control circuit 34Y. An optical axis deflection speed calculating circuit 35 is inputted with an X axis deflection speed signal $v_{xf}$ and a Y axis deflection speed signal $v_{yf}$ respectively detected by the speed detectors 52X and 52Y to obtain an optical axis deflection speed $v_{lo}$ which, in turn, is inputted to a speed/light intensity conversion circuit 36. The speed/light intensity conversion circuit 36 obtains the intensity of the laser beam to be applied to the liquid crystal based on the optical axis deflection speed $v_{lo}$, and inputs a light intensity control signal $l_c$ to the modulator 2 via a switching circuit 37. An optical axis deflection speed instruction calculating circuit 38 is inputted with an X axis speed instruction signal $v_{xp}$ and an Y axis speed instruction signal $v_{yp}$ respectively outputted from the speed limit circuits 32X and 32Y, and obtains an optical axis deflection speed instruction signal $v_{lp}$. An optical axis deflection speed detector 39 detects if the optical axis is being deflected or not based on the presence or absence of the optical axis deflection speed instruction signal $v_{lp}$. In case that the optical axis is being deflected, the switching circuit 37 is turned on.

The operation will now be described.

The laser beam generated by the laser source 1 is applied to the galvanometer mirrors 5X and 5Y via the modulator 2, mirror 3, and expander 4. The angles (positions) of the galvanometer mirrors 5X and 5Y are controlled by the writing control circuit 7. The X axis mirror 54X is driven as in the following. The position control circuit 31X outputs a speed instruction signal $v_{xp}$ proportional to the deviation between the X axis position instruction signal $P_{xp}$ supplied from the controller 8 and the X axis position instruction signal $P_{xf}$ detected by the position detector 53X. The speed instruction signal $v_{xp}$ is inputted to the speed control circuit 33X via the speed limit circuit 32X. The speed control circuit 33X outputs a current instruction signal $i_{xp}$ proportional to the speed deviation between the speed instruction signal $v_{xp}$ and the speed detecting signal $v_{xf}$, and applies it to the current control circuit 34X. The current control circuit 34X is inputted with the current instruction signal $i_{xp}$ and the current detecting signal $i_{xf}$ fed back from the mirror driver circuit 51X, and drives the mirror 54X under control of the mirror driver circuit 51X. With the above operations, the galvanometer mirror 5X of the X axis is controlled to coincide with the X axis position instruction signal $P_{xp}$. Similarly to the galvanometer mirror 5X of the X axis, the galvanometer mirror 5Y of the Y axis is driven to the position coinciding with the Y axis position instruction signal $P_{yp}$. The laser beam whose position on the liquid crystal 10 was determined by the galvanometer mirrors 5X and 5Y, is collected by the scan lens 6 to be applied on the liquid crystal at the determined position. Writing to the liquid crystal 10 is attained by continuously performing the above operations.

The image written on the liquid crystal is projected on the screen 16 by means of the projection system 15. The operation of the projection system 15 is well known so that the detailed description therefor is omitted. To erase the entire image written on the liquid crystal 10, a high AC voltage (e.g., 100 volt) from the controller 8 is applied between an aluminum electrode and a transparent electrode of the liquid crystal 10. Alternatively, to selectively erase the image, a low voltage (e.g., about 20 volt) is applied between both electrodes of the liquid crystal 10, and a laser beam generated by the laser source 1 is applied to the area to be erased.

The writing to the liquid crystal 10 and projection display thereof are performed as described above. Assume that the laser beam is scanned from position P0 to position P3 on the liquid crystal 10 for writing thereto as shown in FIG. 4(a). In this case, the galvanometer mirrors 5X and 5Y are deflected at a speed as shown in FIG. 4(b). Starting from position P0 at time $t_0$, the galvanometer mirrors are driven under constant acceleration to reach position P1 at time t₁ when a 100% speed is attained. From time $t_1$ to time $t_2$ at position P2, the galvanometer mirrors move at a constant speed (100% speed). From position P2, they are reduced in speed under constant deceleration to stop at position P3 at time $t_3$.

The optical axis deflection speed calculating circuit 35 inputted with the X and Y axis speed detecting signals $v_{xf}$ and $v_{yf}$ obtains an optical axis deflection speed $v_{lo}$ in accordance with the following equation:

$$v_{lo} = \sqrt{(v_{xf})^2 + (v_{yf})^2} \quad (1)$$

Figure 6:
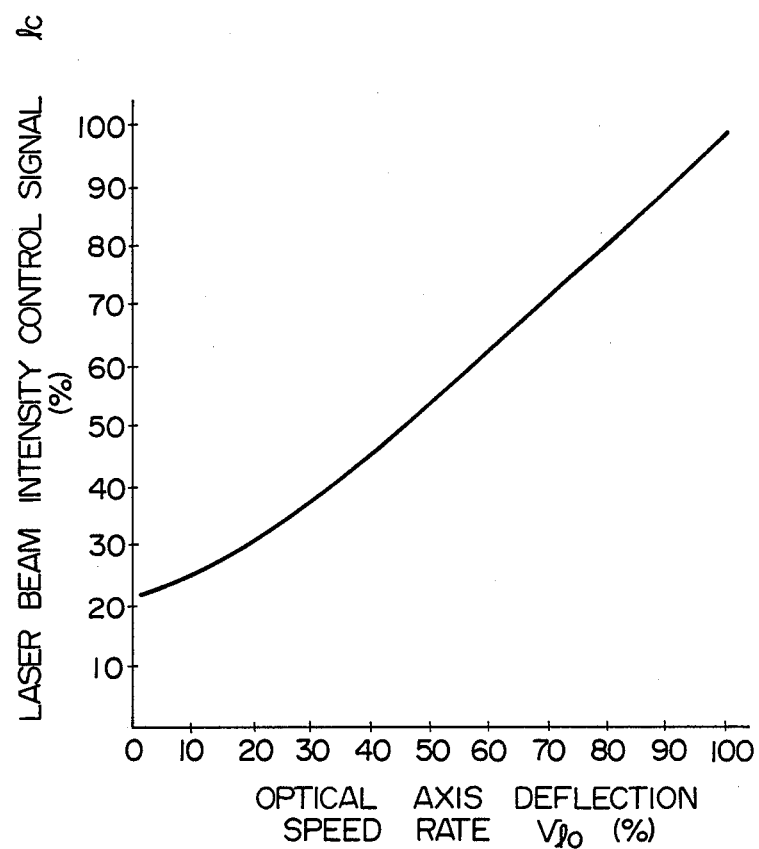
FIG. 6 is a graph illustrating the performance of the speed/light quantity conversion circuit.

The optical axis deflection speed $v_{lo}$ obtained by the optical axis deflection speed calculating circuit 35 is inputted to the speed/light intensity conversion circuit 36, which then outputs an optical axis deflection speed $v_{lo}$ and a light intensity control signal $l_c$ having a characteristic as shown in FIG. 6. The speed/light intensity conversion circuit 36 may be constructed of a function generator, read-only memory or the like. The optical axis deflection speed instruction calculating circuit 38 inputted with the speed instruction signals $v_{xp}$ and $v_{yp}$ of the X and Y axes obtains an optical axis deflection instruction signal $v_{lp}$ in accordance with a similar equation to the equation (1). An optical axis deflection detecting circuit 39 turns on the switching circuit 37 when an optical axis deflection speed instruction signal $v_{lp}$ is present. While writing by moving the optical axis from position P0 to position P3 as shown in FIG. 4(a). The optical axis deflection speed instruction signal $v_{lp}$ is present. Thus the switching circuit 37 remains turned on only while the optical axis moves. Upon turning-on of the switching circuit 37, the light intensity control signal $l_c$ generated by the speed/light intensity conversion circuit 37 is applied to the modulator 2. The light intensity control signal $l_c$ becomes larger as the optical axis deflection speed $v_{lo}$ becomes higher, as shown in the performance graph of FIG. 6. The piezoelectric element driver circuit 26 constituting the modulator 2 makes the piezoelectric element 23 vibrate in proportion to the magnitude of the light intensity control signal $l_c$. The piezoelectric element applies ultrasonic waves to the glass member 22 which, in turn, generates therein compressional waves by which the refractive index of the laser beam changes. The laser beam $I_i$ collected by the lens 24 is split into a first order beam $I_0$ and a second order beam $I_1$ by means of the diffraction grating 22 realized by the compressional waves in the glass member 22. The first order beam $I_0$ is made parallel by the lens 24 and applied to the liquid crystal 10, while the 0 order beam $I_0$ is intercepted by the shutter 25. The piezoelectric element 23 generates ultrasonic waves whose intensity is proportional to the magnitude of the light intensity control signal $l_c$. As the ultrasonic intensity becomes higher, the diffraction efficiency becomes good, to thereby make the intensity of the first order beam $I_1$ high. The modulator 2 changes the intensity of the laser beam to be applied to the liquid crystal 10 in the above-described manner. Consider now that during the time of acceleration from position P0 to position P1, the laser beam intensity becomes high as the optical axis deflection speed $v_{lo}$ becomes high, as shown in FIG. 5. Writing is carried out as described above.

Figure 7:
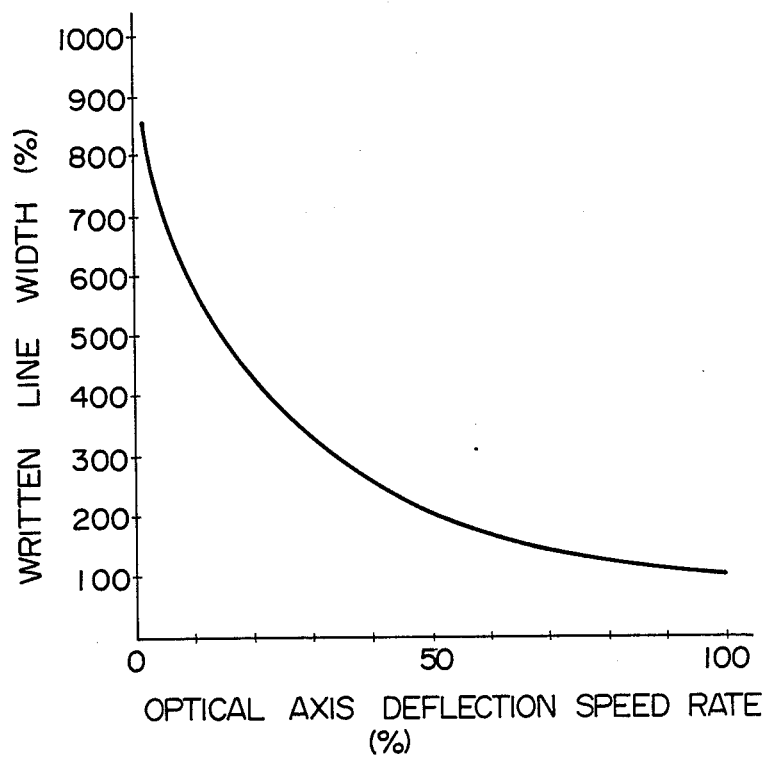
FIG. 7 is a graph showing the written line width against the optical axis deflection speed.
Figure 8:
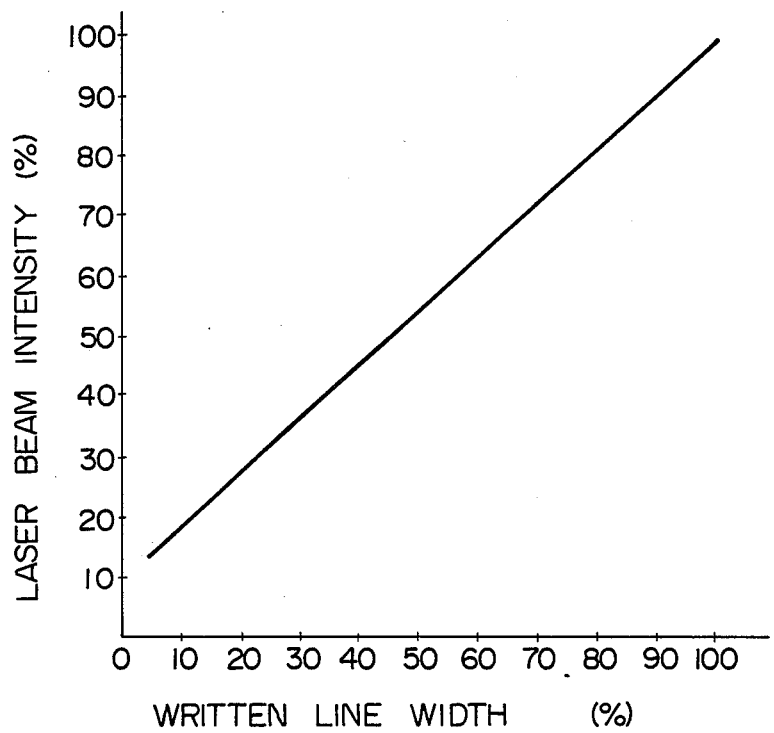
FIG. 8 is a graph showing the laser beam intensity against the written line width.

As seen from the above description, according to the present invention, the intensity of the laser beam applied to the liquid crystal 10 is made high as the optical axis deflection speed $v_{lo}$ becomes high during acceleration of the deflection speed of the galvanometer mirrors 5X and 5Y, i.e., the axis deflection speed. Contrary, during deceleration, the intensity of the laser beam applied to the liquid crystal 10 is made low as the optical axis deflection speed $v_{lo}$ becomes low. The relationship between the optical axis deflection speed $v_{lo}$ and the written line width becomes as shown in FIG. 7 on condition that the intensity of the laser beam applied to the liquid crystal 10 is maintained constant. As seen from FIG. 7, as the optical axis deflection speed $v_{lo}$ becomes low, the written line width becomes broader relative to that at 100% of the optical axis deflection speed $v_{lo}$. Alternatively, the relationship between the laser beam intensity and the written line width becomes as shown in FIG. 8, which shows the experimental results by the inventors, on condition that the optical axis deflection speed $v_{lo}$ on the liquid crystal 10 is maintained constant. As apparent from FIG. 8, the laser beam intensity and the written line width is proportional to each other. It is noted that a laser beam intensity less than 10% is impossible for use in writing.

Figure 9:
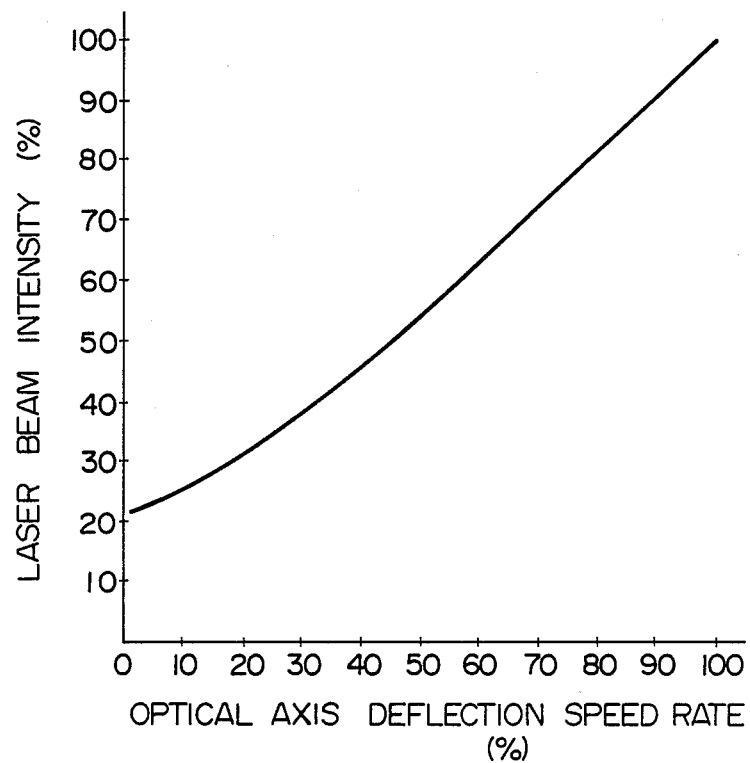
FIG. 9 is a graph showing the laser beam intensity against the optical axis deflection speed.

As apparent from the performances shown in FIGS. 7 and 8, the relationship between the optical axis deflection speed and the laser beam intensity becomes as shown in FIG. 9. Accordingly, it is possible to maintain the written line width constant by controlling the laser beam intensity $l_c$ against the optical axis deflection speed $v_{lo}$ as shown in FIG. 6.

Figure 4:
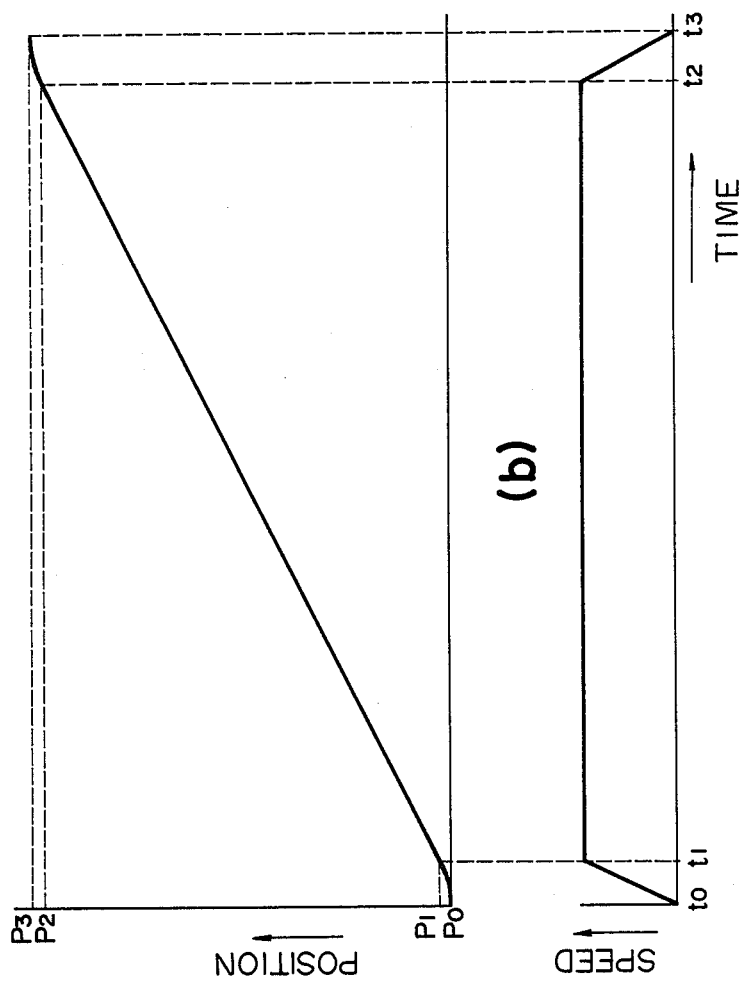
Figure 10:
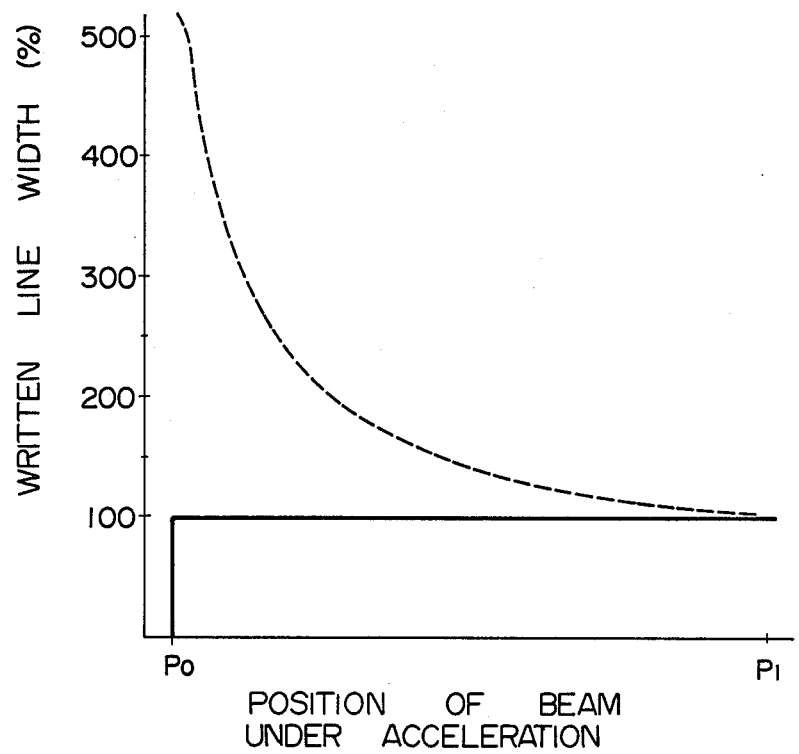
FIG. 10 is a graph showing the written line width against the position of the laser beam under acceleration.

FIG. 10 shows the written line width from position P0 to position P1 of FIG. 4 under acceleration. The solid line shown in FIG. 10 corresponds to the line width obtained according to the present invention, and the dot line corresponds to the line width where the laser beam intensity is not varied with the optical axis deflection speed. As apparent from FIG. 10, according to the present invention, it is possible to maintain the written line width constant irrespective of the high or low optical axis deflection speed.

The foregoing description has been directed to writing to the liquid crystal 10. However, it is also possible to apply to the case where the selective erase with a low voltage applied between the electrodes of the liquid crystal is performed, thus maintaining a constant erase line width. Accordingly, the erasure can be precisely made and the visibility is improved as a matter of course.

Next, the speed limit values $v_{xL}$ and $v_{yL}$ supplied to the speed limit circuits 32X and 32Y will be explained.

Figure 11:
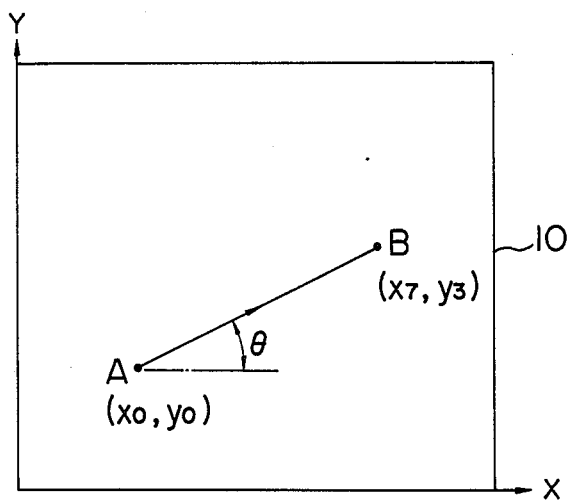
FIG. 11 is a coordinate plane for explaining writing to the liquid crystal.

The speed limit values may be identical to a constant speed (100% speed) $v_{max}$. $v_{max}$ is determined in consideration of the mechanical deflection speeds of the galvanometer mirrors 5X and 5Y and the intensity of the laser beam generated by the laser source 1. In case where the response time in speed of the writing control system differ between the X and Y axes, it is preferable to make the speed limit values $v_{xL}$ and $v_{yL}$ variable as in the following. For example, consider that a straight line is written from point A ($x_0$, $y_0$) to point ($x_7$, $y_3$) on the X-Y coordinate plane of the liquid crystal 10 as shown in FIG. 11. The writing control circuit 7 supplies the position instruction signals $P_{xp}$ and $P_{yp}$ of the X and Y axes representing the ultimate coordinate ($x_7$, $y_3$) and simultaneously therewith, determines the limit values $v_{xL}$ and $v_{yL}$, on the basis of the following concept. The limit values $v_{xL}$ and $v_{yL}$ must suffice the following equations to continuously write to the liquid crystal 10:

$$\frac{v_{yL}}{v_{xL}} = \frac{y_3 - y_0}{x_7 - x_0} \quad (2)$$

$$v_{max} = \sqrt{(x_{xL})^2 + (v_{yL})^2} \quad (3)$$

From the equations (2) and (3), the X axis speed limit value $v_{xL}$ and the Y axis speed limit value $v_{yL}$ are given by the following equations.

$$v_{xL} = \frac{v_{max}}{\sqrt{1 + \tan^2 \theta}} \quad (4)$$

$$v_{yL} + \frac{v_{max}}{\sqrt{1 + \cot^2 \theta}} \quad (5)$$

where $\tan \theta = \frac{y_3 - y_0}{x_7 - x_0}$

Figure 12:
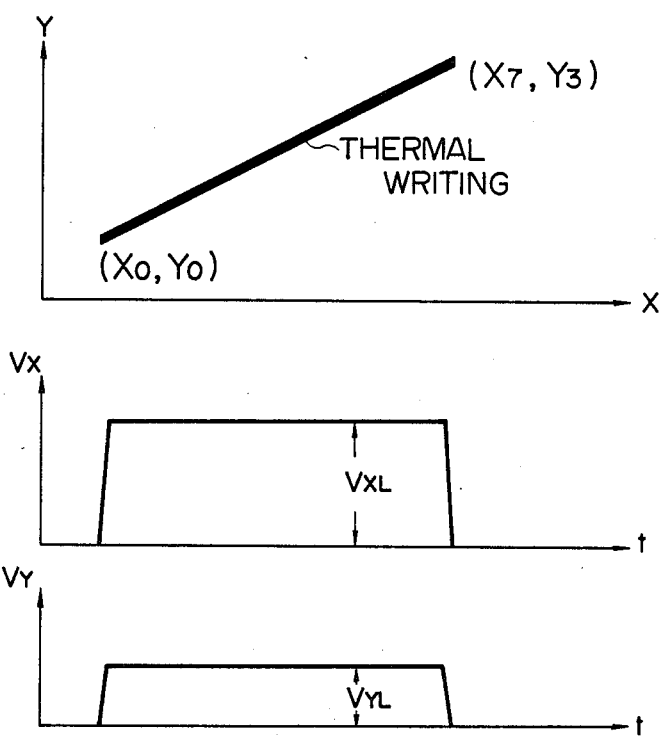
FIG. 12 shows timing charts for explaining the speed limit values.

For writing from point A to point B of FIG. 11, the limit values $v_{xL}$ and $v_{yL}$ become as shown in FIG. 12, the former being larger than the latter. By changing the limit values sufficing the equations (4) and (5) every time writing is performed, it is possible to correctly follow the locus of the straight line even if the response time in speed of the writing control system differs between the X and Y axes. In case a curved line as desired is to be written, the limit values $v_{xL}$ and $v_{yL}$ are continuously changed using the parameter of angle $\theta$.

As described so far, according to the present invention, a constant written line width is ensured merely by changing the intensity of the laser beam applied to the liquid crystal in accordance with the optical axis deflection speed. Therefore, thermal writing of a line with a constant width can be performed in short time.

In the above embodiment, the intensity of the laser beam applied to the liquid crystal is adjusted using the modulator. If a semiconductor laser source is used as the laser source, the semiconductor laser source can vary its laser beam intensity by itself. Obviously, the present invention is also applicable to semiconductor lasers. Further, it is apparent that the modulator may be of the type utilizing the electro-optical effect. Furthermore, the similar advantageous effects can be enjoyed by embodying the present invention using three liquid crystals for color display. In addition, it is apparent that the writing control circuit, screen controller and the like may be substituted for a computer to digitally perform such functions.

We claim:

1. A liquid crystal projection display comprising:
   (a) means for generating a laser beam:
   (b) optical axis control means for changing the optical axis of said laser beam and speed of change thereof by means of mechanical displacement;
   (c) laser beam intensity varying means for varying the intensity of said laser beam generated by said laser beam generating means and incorporating said laser beam into said optical axis control means;
   (d) a liquid crystal to which thermal writing is effected with said laser beam applied by said optical axis control means; and
   (e) writing control means for controlling said mechanical displacement caused by said optical axis control means and controlling said laser beam varying means so as to vary the intensity of said laser beam in accordance with the speed of change of said optical axis to maintain the intensity of a laser beam spot on the liquid crystal constant during the movement of the spot on the liquid crystal, thereby to obtain a constant width line thereon.

2. A liquid crystal projection display according to claim 1, wherein said writing control means varies the intensity of said laser beam applied to said liquid crystal by controlling said laser beam intensity varying means when the speed in mechanical displacement caused by said optical axis control means changes.

3. A liquid crystal projection display according to claim 1, wherein said writing control means comprises position control means for outputting a speed instruction signal corresponding to a deviation between a position instruction signal from said optical axis control means and a position detecting signal, speed control means for outputting a current instruction signal corresponding to a deviation between said speed instruction signal and a varying speed detecting signal from said optical axis control means, and current control means for controlling a current to be supplied to a drive source for said optical axis control means in accordance with said current instruction signal.

4. A liquid crystal projection display according to claim 3 further comprising speed limit means provided between said position control means and said speed control means for limiting said speed instruction signal.

5. A liquid crystal projection display according to claim 4, wherein said speed limit means is set with a constant speed limit value.

6. A liquid crystal projection display according to claim 4, wherein said speed limit means is set with a speed limit value in accordance with said position instruction signal from said optical axis control means.

7. A liquid crystal projection display comprising:
   (a) means for generating a laser beam;
   (b) galvanometer type deflector having two galvanometer mirrors for an X axis and a Y axis for changing the optical axis of said laser beam and speed of change thereof by means of mechanical displacement and applying said laser beam to a liquid crystal;
   (c) a modulator utilizing the electro-optical effect for varying the intensity of said laser beam generated by said laser beam generating means and incorporating said laser beam into said galvanometer type deflector;
   (d) a liquid crystal to which thermal writing is effected with said laser beam applied by said galvanometer type deflector; and
   (e) writing control means for controlling the mechanical displacement of said galvanometer mirrors for the two axes and controlling said modulator so as to vary the intensity of said laser beam in accordance with the speed of change of said optical axis to maintain the intensity of a laser beam spot on the liquid crystal constant during the movement of the spot on the liquid crystal, thereby to obtain a constant width line thereon.

8. A liquid crystal projection display comprising:
   (a) means for generating a laser beam;
   (b) a galvanometer type deflector having two galvanometer mirrors for an X axis and a Y axis for changing the optical axis of said laser beam and speed of change thereof by means of mechanical displacement and applying said laser beam to a liquid crystal;

(c) a modulator utilizing the acousto-optical effect for varying the intensity of said laser beam generated by said laser beam generating means and incorporating said laser beam into said galvanometer type deflector;

(d) a liquid crystal to which thermal writing is effected with said laser beam applied by said galvanometer type deflector; and (e) writing control means for controlling the mechanical displacement of said galvanometer mirrors for the two axes and controlling said modulator so as to vary the intensity of said laser beam: in accordance with the speed of change of said optical axis to maintain the intensity of a layer beam spot on the liquid crystal constant during the movement of the spot on the liquid crystal, thereby to obtain a constant width line thereon.

9. A liquid crystal projection display comprising:

(a) means for generating a laser beam;

(b) optical axis control means for changing the optical axis of said laser beam by means of mechanical displacement and applying said laser beam to a liquid crystal;

(c) a liquid crystal to which thermal writing is effected with said laser beam applied by said optical axis control means;

(d) laser beam intensity varying means capable of varying the intensity of said laser beam generated by said liquid crystal; and (e) writing control means for controlling said mechanical displacement caused by said optical axis control means and controlling said laser beam varying means so as to maintain constant the laser beam energy to be applied to said liquid crystal.

10. A liquid crystal projection display comprising:

(a) a semiconductor laser source for generating a laser beam and capable of adjusting the intensity of said laser beam;

(b) optical axis control means for changing the optical axis of said laser beam and speed of change thereof by means of mechanical displacement and applying said laser beam to a liquid crystal;

(c) a liquid crystal to which thermal writing is effected with said laser beam applied by said optical axis control means; and (d) writing control means for controlling said mechanical displacement caused by said optical axis control means and controlling the intensity of said laser beam generating by said semiconductor laser, said writing control means controlling said semiconductor laser source to vary the intensity of said laser beam in accordance with the speed of change of said optical axis to maintain the intensity of a laser beam spot on the liquid crystal constant during the movement of the spot on the liquid crystal, thereby to obtain a constant width line thereon.

* * * * *